United States Patent Office 3,403,718
Patented Oct. 1, 1968

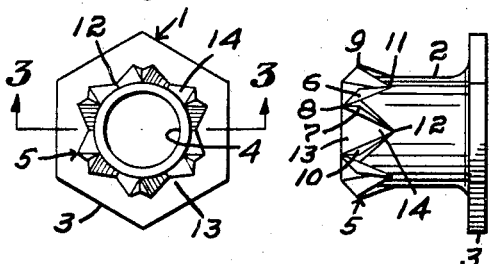
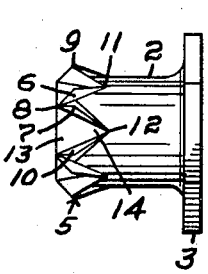
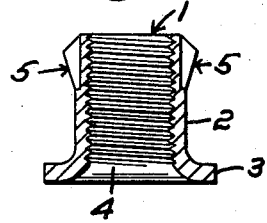
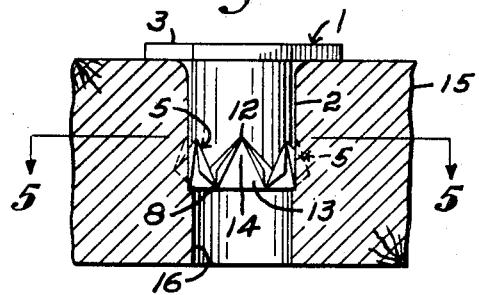
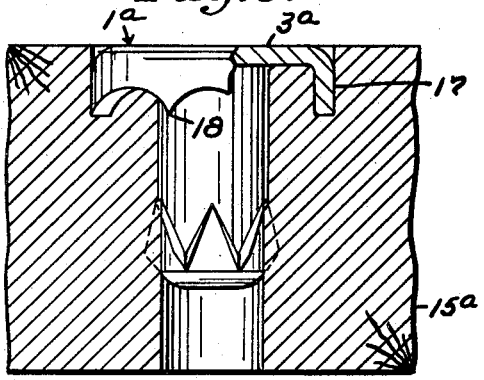
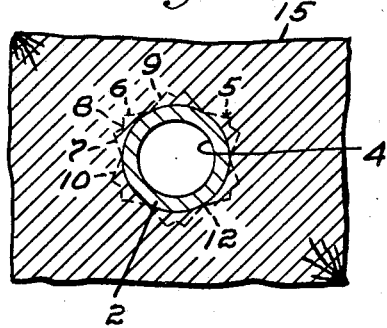
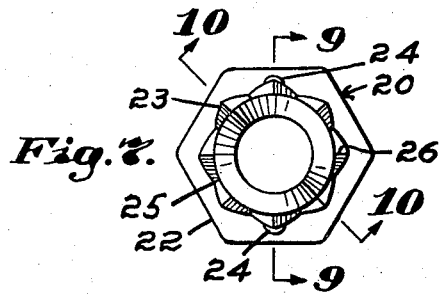
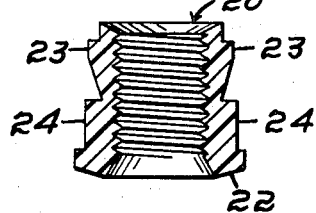
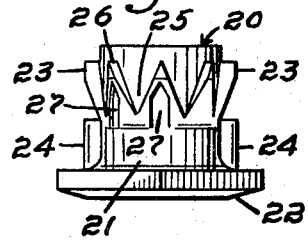
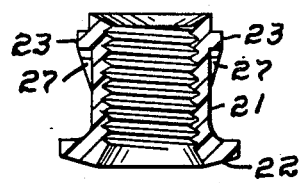

3,403,718
FLANGED INSERT WITH RETAINING MEANS
Norman J. Hughes, Melrose, Mass., assignor to United-Carr Incorporated, Boston, Mass., a corporation of Delaware
Filed Mar. 15, 1967, Ser. No. 623,381
10 Claims. (Cl. 151—41.73)

ABSTRACT OF THE DISCLOSURE

A flanged insert which is driven axially into a bore in a workpiece of relatively soft material such as wood or a wood substitute. For the majority of applications the insert is internally threaded and is of either sheet metal or molded plastic construction. The exterior of the shank portion of the insert has a plurality of retaining fins extending radially outwardly thereof which are embedded in the workpiece and provide a high resistance to pull out. The fins are formed from material skived from the shank of the sheet metal insert and integrally molded on the shank of the plastic embodiment. The fins on the sheet metal part are disposed to engage the workpiece in cooperating pairs and each cooperating pair is spaced from the adjacent pair by an inverted V-shaped flute. Each fin on the plastic part is spaced from the adjacent fin by a V-shaped flute.

Background of the invention

The invention relates generally to fasteners and more specifically to an insert or a nut having a flange at one end and a tubular shank extending from the flange. The end of the shank opposite the flange has a plurality of radially extending fins which will cut into and embed themselves in a fibrous workpiece when the shank is driven axially into a preformed bore in the workpiece. Due to the configuration of the individual fins and the manner in which adjacent fins cooperatively displace and engage the fibrous material, the fastener provides substantially greater resistance to pull out as compared with related prior art fasteners.

For an appreciation of the contribution of the present invention to the field, one should have reference to United States Patents 3,092,162 (H. S. Johnsen) and 3,160,189 (N. J. Hughes), both of which disclose flanged nuts or inserts having integral workpiece engaging means disposed on the shank portions thereof.

The '162 patent is considered pertinent for its disclosure of a part having a plurality of external fins sheared from the shank of a nut, which fins generally extend axially along the tubular shank. Each of the fins, as set forth by the patentee, presents a leading edge lying at an angle of 60° to the axis of the shank and a trailing or upper edge at 45° with the latter portion having substantial thickness to provide a cup-shaped overhang intermediate the length of the shank. Due to the above described configuration of the fins, the nut rotates as it is driven into the preformed bore in a workpiece and each of the fins cuts a helical-like groove in the wall defining the bore. Thereafter, a resistance to easy turning out of the nut is dependent almost exclusively on the tendency of the workpiece material between the fins and the flange to return to its original condition. Moreover, if the end of the shank remote from the flange is subjected to reverse axial force when a power tool is employed to drive a bolt into the nut, the nut will track out of the workpiece by reverse rotation in the grooves formed by the fins on entry.

The nut disclosed by the present inventor in the '189 patent has an external, single thread convolution formed from material shaved from the end of the nut barrel opposite the flange. The part muts be screwed into the workpiece as opposed to being axially driven and is, therefore, subject to being overtorqued when applied to a workpiece and to rotation in the workpiece when a cooperating bolt is turned into its barrel. Because of these deficiencies the part has had little commercial acceptance.

Summary of the invention

The present invention represents a substantial improvement over the prior art mentioned above in that the insert is axially driven into a workpiece absent any rotation and the retaining fins displace and grip the fibrous material in such a way that the insert is securely retained in the workpiece and possesses a very high resistance to pull out.

Brief description of the drawing

The reader will further appreciate the improvement in the art represented by the invention by having reference to the following detailed description in conjunction with a viewing of the accompanying drawing in which:

FIGS. 1 and 2 are a bottom plan view and a side elevational view, respectively, of a preferred form of the invention;

FIG. 3 is a section taken on line 3—3 of FIG. 1;

FIG. 4 is a view of a typical installation depicting the insert of FIGS. 1 through 3 secured in an apertured workpiece, the workpiece being shown in section;

FIG. 5 is a section taken along line 5—5 of FIG. 4;

FIG. 6 depicts an installation similar to that of FIG. 4 wherein a slightly modified form of the invention is employed;

FIG. 7 is a bottom plan view of a molded plastic form of the invention;

FIG. 8 is a side elevation of the insert shown in FIG. 7;

FIG. 9 is a section taken on line 9—9 of FIG. 7; and

FIG. 10 is a section taken on a line 10—10 of FIG. 7.

Description of the preferred embodiments

Referring initially to FIGURES 1 through 4, the insert 1 depicted therein is of sheet metal construction and includes a hollow, tubular shank 2 and a peripheral flange 3 extending radially outwardly from one end of the shank. The internal wall of the hollow shank is conventionally threaded as at 4, but optionally may be unthreaded if, for example, the insert is to be employed as a bushing instead of a nut. The end of the shank 2 opposite the flange 3 is provided with a plurality of laterally extending fins 5 spaced about the periphery of the shank. The fins 5 were formed by skiving the metal from the end of the shank by appropriate shaving tools (not shown) as will be understood by anyone skilled in the fastener art. As best seen in FIGURES 2 and 3, each of the fins is of relatively thin cross section and each has a generally triangular shape in elevation with the short side of the triangle facing away from the flange 3. The fins are disposed in cooperating pairs, for example, fins 6 and 7, FIGURE 2, the leading edges of which intersect in a sharp point 8. From the point 8 the fins progressively diverge and ultimately intersect the trailing ends of adjacent fins 9, 10 at points 11, 12, respectively. Thus, the shank 2 is also provided with a plurality of spaced, inverted V-shaped flutes 13 between each pair of cooperating fins and a shallow pocket 14 is formed at the vertex of each of the flutes.

The insert 1 is secured in the wooden workpiece 15 shown in FIGURE 4 by driving the shank 2 axially into the bore 16, which has a diameter approximately equal to the external diameter of the shank portion between the fins 5 and the flange 3, by striking the upper surface of the flange with a mallet or other appropriate tool. As the shank moves into the bore 16, the leading edges of the fins cut into the wall defining the bore, thereby displacing and at least partially severing the fibers. Certain of the displaced and/or severed fibers are forced into the flutes 13 and ultimately become jammed into the shallow pockets 14 at the vertex of each of the flutes, while other fibers are jammed into the gap between the pairs of cooperating fins, for example, fins 6 and 7, and are actually clamped between the opposed facing surfaces of the fins. When the insert reaches the position shown in FIGURE 4, the leading edge or each fin and its lateral apex are embedded in the wall of the bore 16. Further, certain fibers, which are only laterally displaced or compressed by the fins as they pass into the bore will, over a period of time, tend to return to their original condition behind the surfaces of the fins which face the flange 3 to further enhance the holding power of the insert.

The reader will obtain a clear indication of the increased holding power of the present invention as compared with the device disclosed in the Johnsen patent mentioned above by having the reference to the following table which indicates the results of recent comparison tests between the two types of fasteners. Each of the test samples had a one inch shank. The numerical values represent the pull measured in pounds required to dislodge the two fasteners from both the side and end of test blocks of the four types of wood specified. The testing machine (Baldwin-Southwark Tensile-Compression Testing Machine) was operated at a constant speed for all tests.

wood laminates, wood particle boards and Masonite. As the shank 21 is driven into the workpiece, the fins 23 cut into the wall of the bore thereby displacing the fibrous material and forcing it into the flutes 25 where it is ultimately trapped. Portions of the wall of the bore are also compressed and displaced laterally by the fins and, over a period of time, these portions tend to creep back to their original condition and seat in the recesses 27 formed in certain of the fins 23. The lugs 24 which follow the fins into the bore jammed into the grooves cut by the fins and thereafter provide added resistance to rotation of the insert when a bolt is torqued into the shank 21. The combined action of the fins 23 embedding themselves in the workpiece, the displaced fibrous material becoming trapped in the apices of the flutes 25, the fibrous material seating in the recesses 27 and the lugs 24 becoming jammed in the grooves cut by the fins provides a high resistance to pull out and rotation of the insert.

I claim:
1. An insert adapted to be fixedly seated in a bore in a workpiece comprising a hollow, continuous tubular shank, a radially extending flange at one end of said shank, and a plurality of workpiece-engaging fins disposed about the periphery of said shank, each of said fins having a sharp leading edge facing away from said flange and disposed proximate the end of said shank remote from said flange and a trailing edge which merges with the trailing

|  | Part tested | | | | | | | |
|---|---|---|---|---|---|---|---|---|
|  | Pine | | White cedar | | Red cedar | | Lauan | |
|  | Side | End | Side | End | Side | End | Side | End |
| Device disclosed in Pat. 3,092,162 | 48 | 36 | 62 | 28 | 90 | 72 | 170 | 126 |
| Present invention | 155 | 85 | 130 | 90 | 154 | 122 | 365 | 138 |

The significant difference between the form of the invention shown in FIGURE 6 and that described above is to be observed in the flange 3a which has a turned-down lip 17. The free edge of the lip 17 is scalloped to provide a plurality of prongs 18. Thus, the flange 3a may be driven into the workpiece 15a until it is flush with the top surface thereof. This form of the invention has particular usefulness in knockdown furniture applications where, for example, the workpiece 15a having the insert 1a secured therein is fastened to the base of a table top with the insert providing a blind fastener for receipt of a lag bolt when the table legs are to be attached.

As previously stated, the form of the invention depicted in FIGURES 7 through 10 is of one piece, molded plastic construction, for example, the tough polycarbonate marketed by General Electric Company under the trademark "Lexan." This material possesses exceptional toughness and is capable of withstanding high impact without fracturing. The insert 20 includes a hollow, internally threaded, tubular shank 21, a peripheral end flange 22, a plurality of wedge-shaped fins 23 located adjacent the end of the shank opposite the flange, and a pair of longitudinally extending lugs 24 disposed on opposite sides of the shank between the flange 22 and the fins 23. The fins are spaced from one another by V-shaped flutes 25 and the leading edge 26 of each fin is slightly spaced from the end of the shank. Two adjacent fins 23 on opposite sides of the shank 21 are formed with wedge-shaped recesses 27, the purpose of which will be discussed hereinafter.

The insert is secured to a workpiece in the same manner as the previously described forms of the invention, i.e., by hammering the shank into a preformed bore in the workpiece. Ideally, the diameter of the bore should be approximately equal to the external diameter of the shank 21. The portion of the shank beyond the leading edges of the fins provides a lead-in to the bore. The plastic insert was designed primarily for use with softer woods, edge of an adjacent fin at the apex of an inverted V-shaped flute defined by the sides of said adjacent fins and the portion of the shank therebetween, said last-mentioned shank portion having an external diameter which is less than the external diameter of the portions of said shank immediately beyond the vertices of said flutes whereby a pocket for the receipt of portions of the wall of the workpiece defining the bore is formed, which portions are displaced by said fins and forced into said flutes when said shank is axially driven into the bore.

2. An insert according to claim 1 which is of molded plastic construction.

3. An insert according to claim 1 which is of sheet metal construction wherein said fins are formed from material skived from the end of said shank opposite said flange.

4. An insert according to claim 1 wherein said fins are disposed in cooperating pairs having a narrow gap between said leading edges whereby displaced portions of the workpiece are also clamped between the opposed surfaces of each cooperating pair defining said gap.

5. An insert according to claim 1 wherein said flange is provided with a plurality of prongs spaced from said shank and extending in the direction of the end of said shank remote from said flange whereby said insert may be driven into flush engagement with the surface of the workpiece adjacent one end of the bore.

6. An insert according to claim 1 wherein said shank is internally threaded.

7. An insert according to claim 6 including at least a pair of longitudinally extending lugs disposed on said shank between said fins and said flange to provide increased resistance to rotation of said insert in the workpiece when a cooperating fastener is applied to said insert.

8. An insert according to claim 7 wherein certain of said fins are provided with wedge-shaped recesses for receipt of the displaced portions of the workpiece.

9. A molded plastic insert adapted to be fixedly seated in a bore in a workpiece comprising a hollow, tubular shank, a radially extending flange at one end of said shank, a plurality of workpiece engaging fins disposed about the periphery of said shank, each of said fins having a sharp leading edge facing away from said flange and disposed proximate the end of said shank remote from said flange and an outer face extending rearwardly from said leading edge toward said flange, the outer face of certain of said fins having an elongated recess formed therein, and at least a pair of longitudinally extending lugs disposed on said shank between said flange and said fins, said lugs being generally axially aligned with the leading edges of certain of said fins.

10. A molded plastic insert according to claim 9 wherein the edges of the outer faces of adjacent fins merge at the apex of an inverted V-shaped flute defined by the sides of said fins and a portion of said shank.

References Cited

UNITED STATES PATENTS

| | | | |
|---|---|---|---|
| 722,046 | 3/1903 | Rieger | 151—41.73 |
| 1,978,329 | 10/1934 | Rosenberg | 85—21 |
| 2,055,443 | 9/1936 | Jones | 151—41.73 |
| 2,927,497 | 3/1960 | Rapata | 85—21 |
| 2,949,142 | 8/1960 | Sumerak | 151—41.73 |
| 3,092,162 | 6/1963 | Johnsen | 151—41.73 |
| 3,124,189 | 3/1964 | Dietlein | 151—41.73 |

FOREIGN PATENTS

| | | |
|---|---|---|
| 1,062,244 | 12/1953 | France. |
| 1,076,611 | 4/1954 | France. |
| 1,277,555 | 10/1961 | France. |
| 916,048 | 1/1963 | Great Britain. |
| 948,945 | 2/1964 | Great Britain. |

MARION PARSONS, Jr., *Primary Examiner.*